US012766999B2

(12) United States Patent
Levin et al.

(10) Patent No.: US 12,766,999 B2
(45) Date of Patent: Oct. 20, 2026

(54) METHOD FOR ENERGY MANAGEMENT AND AN ELECTRIC DRIVELINE SYSTEM

(71) Applicant: VOLVO TRUCK CORPORATION, Gothenburg (SE)

(72) Inventors: Robin Levin, Kungsbacka (SE); Niklas Dyverfors, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 141 days.

(21) Appl. No.: 18/357,529

(22) Filed: Jul. 24, 2023

(65) Prior Publication Data

US 2024/0059179 A1 Feb. 22, 2024

(30) Foreign Application Priority Data

Aug. 16, 2022 (EP) .................................... 22190541

(51) Int. Cl.
*B60L 58/12* (2019.01)
*B60L 7/10* (2006.01)
(Continued)

(52) U.S. Cl.
CPC ................ *B60L 58/12* (2019.02); *B60L 7/10* (2013.01); *B60L 7/18* (2013.01); *B60L 7/22* (2013.01);
(Continued)

(58) Field of Classification Search
CPC ...... B60L 58/12; B60L 7/10; B60L 2240/642; B60L 7/22; B60L 58/15; B60L 2200/36;
(Continued)

(56) References Cited

U.S. PATENT DOCUMENTS 8,862,356 B2 * 10/2014 Miller ........................ B60L 7/24 180/282
9,102,316 B2 * 8/2015 Hamborg ............ B60W 10/184
(Continued)

FOREIGN PATENT DOCUMENTS

| | | | |
|---|---|---|---|
| EP | 3266645 | A1 | 1/2018 |
| WO | 2015089650 | A1 | 6/2015 |
| WO | 2020143495 | A1 | 7/2020 |

OTHER PUBLICATIONS

Extended European Search Report in corresponding European Application No. 22190541.7 dated Feb. 7, 2023 (9 pages).
(Continued)

*Primary Examiner* — Jelani A Smith
*Assistant Examiner* — Dana D Ivey
(74) *Attorney, Agent, or Firm* — Jeffri A. Kaminski; Venable LLP

(57) ABSTRACT

A method for energy management of an electric energy storage of an electric vehicle comprising at least one electric machine. The method includes determining a potential regenerative charging amount for the electric energy storage during an upcoming braking cycle for the electric vehicle; before reaching the braking cycle, generating driving torque using at least one electric machine while at the same time generating a braking torque using a brake generating device to discharge the electric energy storage sufficient to receive the potential regenerative charging amount at the upcoming braking cycle, wherein the generated driving torque corresponds to the sum of a demanded driving torque and the generated braking torque.

12 Claims, 6 Drawing Sheets

(51) Int. Cl.

| | |
|---|---|
| *B60L 7/18* | (2006.01) |
| *B60L 7/22* | (2006.01) |
| *B60L 15/20* | (2006.01) |
| *B60L 58/15* | (2019.01) |

(52) U.S. Cl.
CPC ....... *B60L 15/2009* (2013.01); *B60L 15/2045* (2013.01); *B60L 58/15* (2019.02); *B60L 2200/36* (2013.01); *B60L 2220/42* (2013.01); *B60L 2240/423* (2013.01); *B60L 2240/642* (2013.01); *B60L 2260/50* (2013.01)

(58) Field of Classification Search
CPC ........... B60L 2220/42; B60L 2240/423; B60L 2260/50; B60L 15/2009; B60L 15/2045; B60L 7/18
USPC ............................................................ 701/22
See application file for complete search history.

(56) References Cited

U.S. PATENT DOCUMENTS

| | | | | |
|---|---|---|---|---|
| 2009/0114464 | A1* | 5/2009 | Imamura ............... | B60W 10/06 180/65.285 |
| 2010/0292882 | A1* | 11/2010 | Murata ................. | B60W 10/08 701/22 |
| 2014/0148983 | A1* | 5/2014 | Kim ...................... | B60W 10/02 180/65.265 |
| 2015/0073637 | A1 | 3/2015 | Lennevi et al. | |
| 2017/0120892 | A1 | 5/2017 | Kato et al. | |
| 2018/0086227 | A1 | 3/2018 | Healy et al. | |
| 2018/0326860 | A1 | 11/2018 | Ito et al. | |
| 2020/0021209 | A1 | 1/2020 | Polcuch | |
| 2020/0164880 | A1* | 5/2020 | Cho ...................... | B60W 20/14 |
| 2021/0086652 | A1* | 3/2021 | Follen ................... | B60W 20/12 |

OTHER PUBLICATIONS

European Communication pursuant to Article 94(3) EPC dated Sep. 27, 2024 in corresponding European Patent Application No. 22190541.7, 5 pages.

European Communication pursuant to Article 94(3) EPC dated Mar. 27, 2025 in corresponding European Patent Application No. 22190541.7, 7 pages.

European Communication under Rule 71(3) EPC dated Jan. 30, 2026 in corresponding European Patent Application No. 22190541.7, 33 pages.

* cited by examiner

METHOD FOR ENERGY MANAGEMENT AND AN ELECTRIC DRIVELINE SYSTEM

TECHNICAL FIELD

The present disclosure relates to a method for energy management of an electric energy storage of an electric vehicle. The present disclosure also relates to a driveline system, a control unit, and a computer program. Although the method and system will be described in relation to a vehicle in the form of a truck, the method and system can also be efficiently incorporated in other vehicle types such as busses, light-weight trucks, passenger cars, construction equipment, marine vessels, and industrial equipment, as long as they are at least partly electrically propelled.

BACKGROUND

Batteries are becoming a more common source of energy for providing propulsion power to vehicles. Such batteries are rechargeable batteries and consist of several battery cells that may be connected in series and/or in parallel forming a complete battery pack for the vehicle.

In conventional drivelines a retarder can be used as an auxiliary break to generate braking torque by converting the kinetic energy of the vehicle to heat. For electric vehicles powered by a propulsion battery, it is also possible to use an electric machine to generate braking torque. However, this requires that there is enough capacity in the battery to store the energy generated from the electric machine during the whole breaking cycle. To alleviate this, a brake resistor is often introduced as an added component, that converts the electric energy into heat that is dissipated through surrounding air or a cooling system.

However, both retarders and break resistors are space and cost demanding. A further option is to at all times ensure to have enough capacity in the batteries for receiving regenerative charging during the breaking cycle. Unfortunately, this leads to that the battery state of charge window is heavily reduced in case of long potential downhill driving.

Accordingly, there is a need for better energy management for propulsion batteries for handling regenerative energy at downhill driving.

SUMMARY

An object of the invention is to provide an improved method for energy management of an electric energy storage of an electric vehicle and a corresponding electric driveline system.

According to the first aspect of the invention, there is provided a method for energy management of an electric energy storage of an electric vehicle comprising at least one electric machine, the method comprising: determining a potential regenerative charging amount for the electric energy storage during an upcoming braking cycle for the electric vehicle; before reaching the braking cycle, generating driving torque using at least one electric machine while at the same time generating a braking torque using a brake generating device to discharge the electric energy storage sufficient to receive the potential regenerative charging amount at the upcoming braking cycle, wherein the generated driving torque corresponds to the sum of a demanded driving torque and the generated braking torque.

By the provision of generating driving torque while at the same time generating braking torque in such a way that generated driving torque corresponds to the sum of a demanded driving torque and the generated braking torque, the vehicle can drive as expected by the driver and at the same time create the needed state of charge window in the electric energy storage for the coming braking cycle. Once at the braking cycle, enough capacity for receiving charge is available in the electric energy storage to cope with the energy generated during the breaking cycle.

In other words, by means of embodiments described herein, since the potential regenerative charging amount is determined prior to reaching the braking cycle, the appropriate energy in the electric energy storage can be discharged when it is needed prior to reaching the braking cycle. This provides for better planning of the discharge event compared to always ensure to have sufficient available state of charge headroom in the electric energy storage.

The electric energy storage may be a propulsion battery and should be interpreted as providing propulsion energy to the vehicle. Thus, the vehicle may be an electric, hybrid, or plug-in hybrid vehicle comprising an electric engine, wherein the propulsion battery provides power to the electric engine for providing propulsion for the electric, hybrid, or plug-in hybrid vehicle. The battery may be Li-ion battery comprising multiple cells arranged in series and in parallel as is known in the art.

The potential regenerative charging amount may for example be in terms of state of charge amount expected to be available at the braking cycle, or the expected energy absorbed during the braking cycle.

The demanded driving torque corresponds to the torque needed to fulfil a driver request. Stated in another way, the demanded driving torque corresponds to what the driver expects when requesting a propulsion torque for driving the vehicle forward. For example, when the driver applies a force on the drive pedal, a certain amount of driving torque is expected by the driver. The sum of this demanded driving torque and the generated braking torque should substantially correspond to the generated driving torque. In other words, the electric machine that generates driving torque will be controlled to provide a driving torque that is larger than the driving torque demanded by the driver.

According to an example embodiment, the electric vehicle may comprise at least two electric machines, wherein the brake generating device is at least one of the electric machines that is not generating driving torque. Hereby, at least one electric machine is configured or utilized to generate driving torque, and at least one of the remaining electric machines is configured or utilized to generate the braking torque. By utilizing on the electric machines to generate a braking torque that at least partly counteracts the generated driving torque, an increased energy loss is generated that is converted to heat and absorbed by the cooling system of the vehicle. In this way, a space demanding and costly brake resistor for dissipating energy from the electric energy storage, or a large retarder can be avoided. The electric machines are part of a driveline of the electric vehicle to provide propulsion for the vehicle.

Accordingly, generating driving torque using at least one electric machine while at the same time generating a braking torque using at least one other electric machine is performed to reduce the energy efficiency of the electric drivetrain and therefore increase the total amount of electric power used to propel the vehicle.

In one embodiment, the electric vehicle may comprise a secondary braking system, wherein generating the braking torque comprises generating at least part of the braking torque using the secondary braking system. The secondary braking system may assist an electric machine for generating braking torque and may be a smaller size retarder compared to conventional retarders used in combustion engine propelled vehicles. For example, a conventional retarder may provide a brake power of 300-500 kW which is absorbed by a cooling system of the vehicle. With the proposed embodiment, a portion of this brake power is used for charging the electric energy storage system. This means that the retarder can advantageously be dimensioned with a reduced maximum brake power capability compared to that of traditional systems.

According to an example embodiment, the method may comprise acquiring planned route data indicative of a drive cycle of the electric vehicle including the braking cycle, wherein the step of determining a potential regenerative charging amount comprises determining the potential regenerative charging amount using the planned route data. Hereby, the upcoming need for energy storage capacity corresponding to the potential regenerative charging amount can be accurately determined both in time and in amount of needed energy storage capacity.

Acquiring the planned route data may include using a predictive route function where the planned route is determined from historical location and driving data indicating prior routes. Further, acquiring the planned route data may in other possible implementations include acquiring location data of the planned route for the vehicle, such as from a requested GPS based route or from a planned commercial drive route such as a bus route or commercial truck route associated with an assignment.

According to an example embodiment, generating the driving torque before reaching the braking cycle may comprise initiating the generation of driving torque at a time and with a magnitude so that the discharging of the electric energy storage is completed immediately before reaching the braking cycle. Thus, with information about the location of the braking cycle and the potential regenerative charging amount, the time and magnitude of the generation of driving torque and corresponding braking torque can be initiated timely to be completed at the braking cycle or just before reaching the brake cycle. This ensures that the electric energy storage is not discharged too early and that the electric energy storage maintains a satisfactory state of charge level as often as possible.

According to an example embodiment, the potential regenerative charging amount may be determined from historical potential regenerative charging amounts at the upcoming braking cycle. Thus, potential regenerative charging amounts from prior drive cycles at the specific braking cycle for the vehicle may be evaluated for determining the present the potential regenerative charging amount for the present upcoming braking cycle. For example, information concerning recent potential regenerative charging amounts at the upcoming brake cycle may be used as input, and adjusted according to the present weight of the vehicle to determine the potential regenerative charging amount for the upcoming braking cycle. Further, data such as outside temperature, battery temperature, battery aging, to mention a few examples may be taken into the evaluation to account for the battery condition when determining the potential regenerative charging amount.

According to an example embodiment, the potential regenerative charging amount is determined from a topography of the planned route from which an upcoming braking cycle can be predicted. The topography may be acquired from GPS or other map data provides data indicating the altitude the vehicle will drop at the braking cycle. The potential energy can be calculated from the loss in altitude together with the vehicle weight and speed.

Further, the step of determining a potential regenerative charging amount may comprise predicting the upcoming braking cycle based on a present location of the electric vehicle and historical driving routes of the electric vehicle itself and/or historical driving routes for a plurality of secondary vehicles. For example, a cloud-based system may collect and memorize routes travelled by a fleet of vehicles. The cloud-based system may collect data such as type of road, speed, road inclination, altitudes, etc. so that the vehicle can use this information for predicting an upcoming braking cycle and characteristics thereof, such as topography for determining the potential regenerative charging amount, or even the potential regenerative charging amount itself.

According to the second aspect of the invention, there is provided an electric driveline system for an electric vehicle comprising an electric energy storage, the driveline system comprising: at least one electric machine configured to provide driving torque and a brake generating device configured to provide braking torque to a driveline of the electric machine, and a control unit configured to: acquire data indicating a potential regenerative charging amount for the electric energy storage during an upcoming braking cycle for the electric vehicle; before reaching the braking cycle, control at least one electric machine to generate driving torque and the brake generating device to simultaneously as the driving torque is generated, generate braking torque, to discharge the electric energy storage sufficient to receive the potential regenerative charging amount at the upcoming braking cycle, wherein the generated driving torque corresponds to the sum of a demanded driving torque and the generated braking torque.

The at least one electric machine are part of a driveline, or interchangeably named drivetrain, of the electric vehicle to provide propulsion for the vehicle.

According to an example embodiment, the brake generating device may be a further electric machine configured to provide the braking torque. Thus, the electric machines are further utilized for generating increased losses in power to thereby discharge the electric energy storage system. The counteracting of the electric machines increases the losses in the electric energy storage system that may be converted to heat and absorbed by a cooling system of the vehicle. Thereby, the energy efficiency of the electric drivetrain is temporally reduced and therefore increases the total amount of electric power used to propel the vehicle so that energy can be discharge from the electric energy storage.

According to an example embodiment, the brake generating device may comprise a retarder configured to provide at least part of the braking torque.

According to an example embodiment, the control unit may be configured to acquire planned route data indicative of a drive cycle of the electric vehicle including the braking cycle, and to determine the potential regenerative charging amount from the planned route data.

Effects and features of the second aspect of the invention are largely analogous to those described above in connection with the first aspect.

According to a third aspect of the invention, there is provided a vehicle comprising the system according to the second aspect.

According to a fourth aspect of the invention, there is provided a computer program comprising program code means for performing the steps the first aspect when the program is run on a computer.

According to a fifth aspect of the invention, there is provided a computer readable medium carrying a computer program comprising program code means for performing the steps of the first aspect when the program product is run on a computer.

According to a sixth aspect of the invention, there is provided control unit for energy management of an electric energy storage of an electric vehicle comprising at least one electric machine, the control unit being configured to perform the steps of the method according to the first aspect.

Effects and features of the third, fourth, fifth, and sixth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
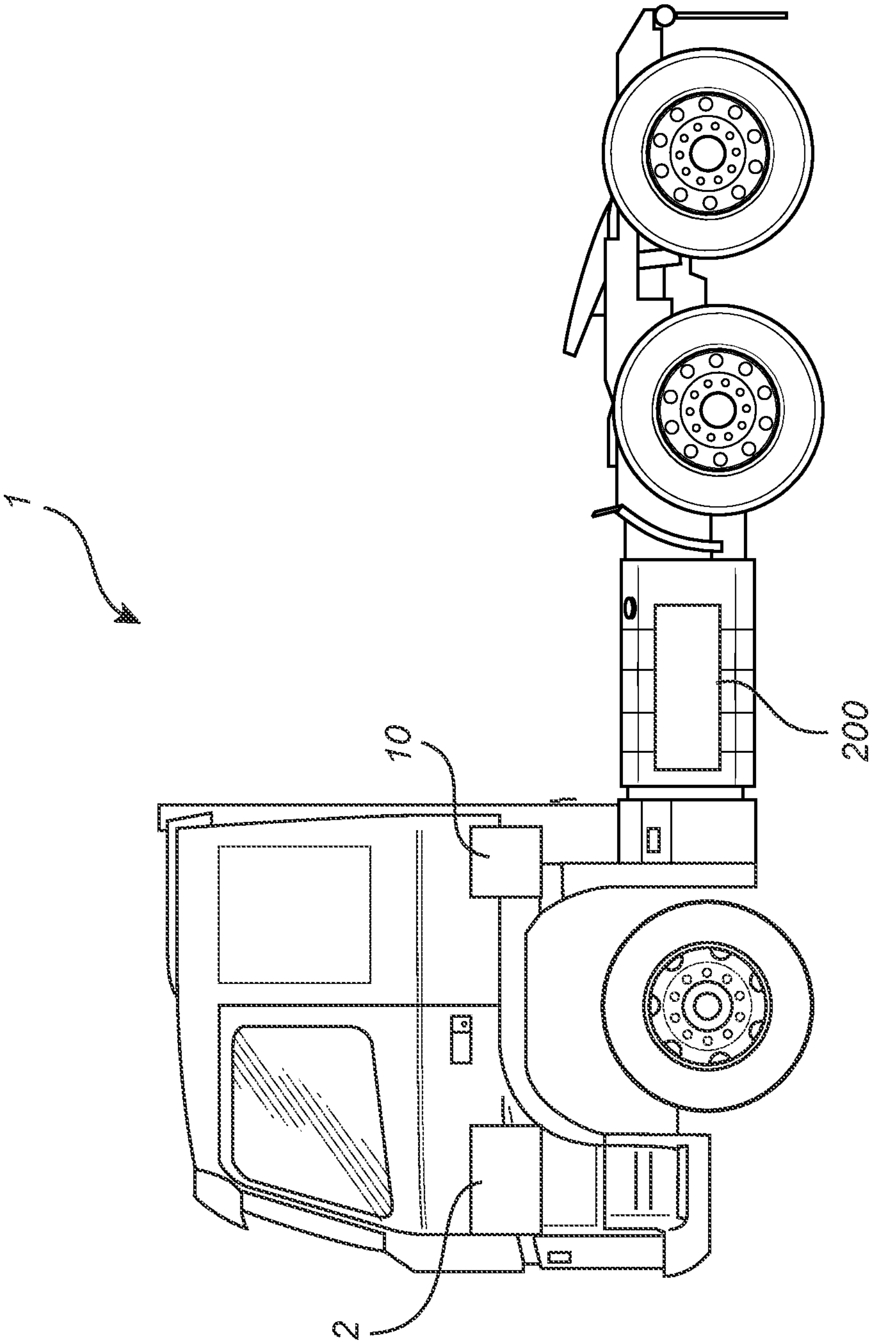
FIG. 1 is a vehicle in the form an electric truck according to example embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims.

Like reference character refer to like elements throughout the description.

FIG. 1 illustrates a vehicle in the form of an electric truck 1 comprising a propulsion battery 2 generally comprising a plurality of series and parallel connected battery cells. The propulsion battery 2 is arranged to provide power to an electric driveline system 200 arranged for providing propulsion and braking torque for the electric truck 1. The electric truck 1 further comprises a battery managing system 10 which is configured to monitor battery cell characteristics such as SOC, battery voltage, and optionally temperature of the battery cells. The propulsion battery 2 may be a Li-ion battery comprises multiple cells electrically connected in series and in parallel.

Although the vehicle in FIG. 1 is depicted as a heavy-duty truck, embodiments of the present disclosure may as well be implemented in other types of vehicles, such as in busses, light-weight trucks, passenger cars, construction equipment, industrial applications, and marine applications including e.g. vessels or ships.

Figure 2:
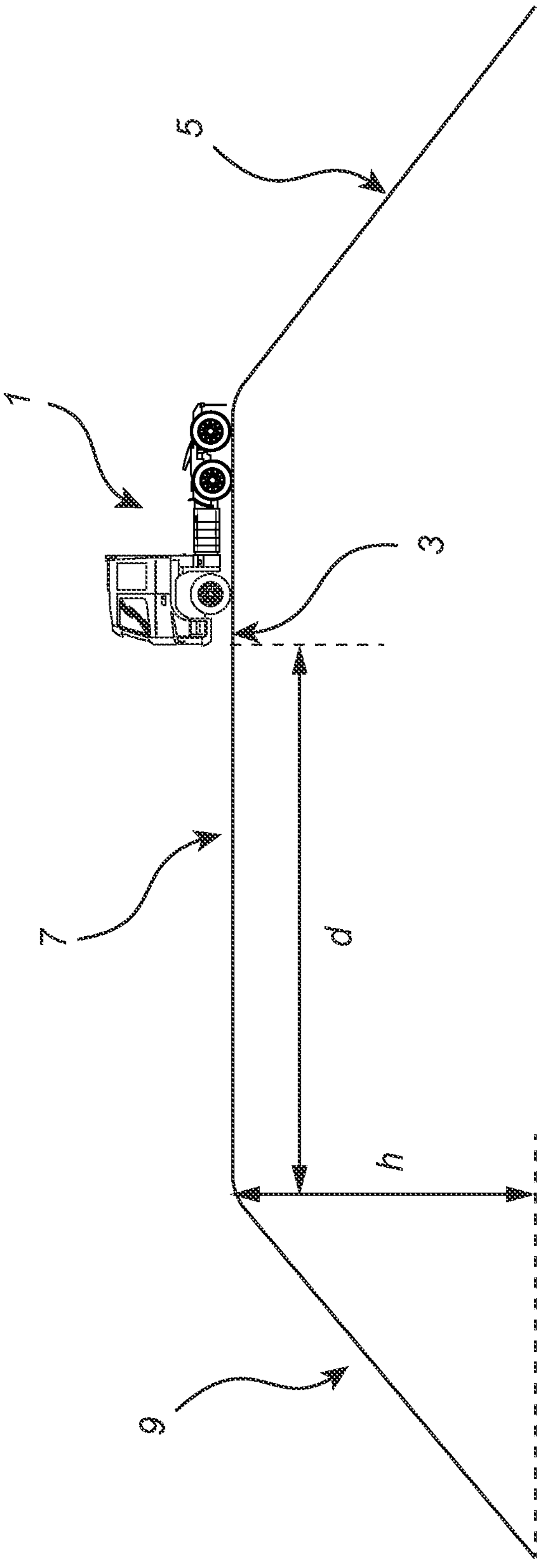
FIG. 2. conceptually illustrates a vehicle travelling along a route and implementing example embodiments of the invention.

FIG. 2 conceptually illustrates a vehicle 1 travelling along a route 3. The route 3 is here shown including an uphill section 5, a relatively level or horizontal section 7 and a downhill section 9. The electric vehicle 1 needs to use a certain amount of energy in its battery 2 to travel to the section 7, and especially in this case preceded by an uphill section 5 leading to the elevated section 7. When the electric vehicle 1 reaches the downhill section 9, there is need for generating braking torque which means there is required to be room for regenerative charging of the battery 2. In order to avoid always making sure that there is room for regenerative charging, which may lead to insufficient state of charge especially for propulsion after traveling uphill through the uphill section 5, and to avoid using large brake resistors, the inventors propose an improved method and driveline system 200 which will now be described in more detail.

Figure 3:
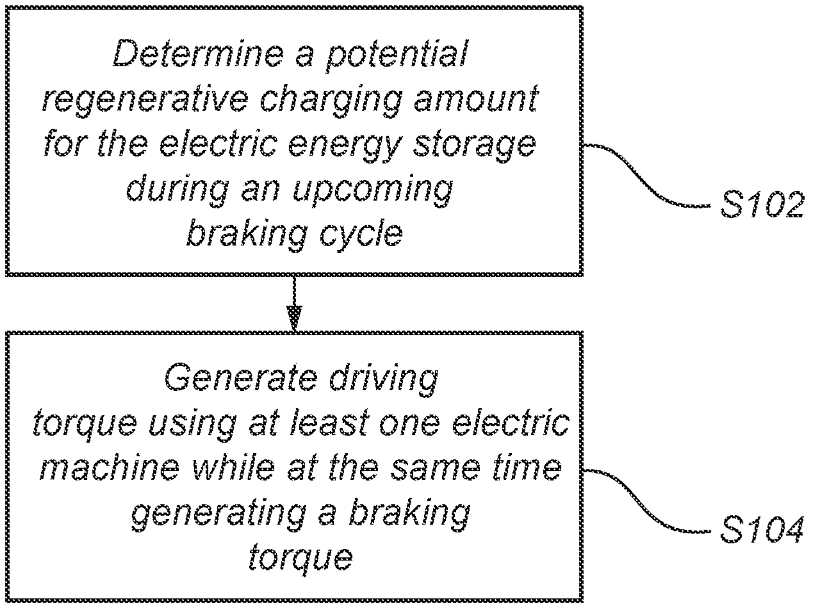
FIG. 3 is a flow-chart of method steps according to example embodiments of the invention.

Now turning to the flow-chart in FIG. 3. In step S102, determining a potential regenerative charging amount for the electric energy storage 2 during an upcoming braking cycle 9 for the electric vehicle 1.

Figure 5:
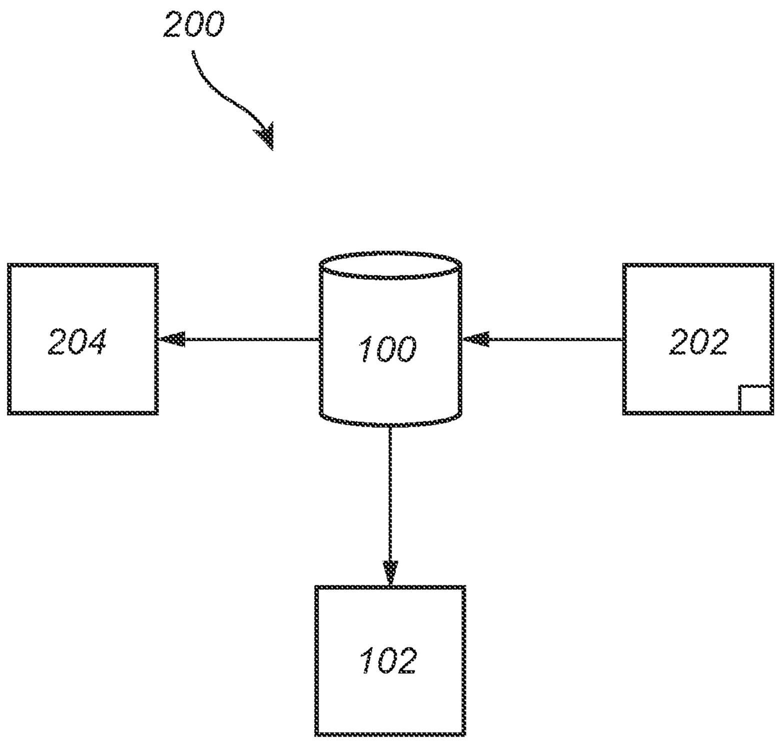
FIG. 5 is a block diagram of a system according to example embodiments of the invention.

A block diagram of the driveline system 200 is shown in FIG. 5, comprising at least one electric machine 102 configured to provide driving torque and a brake generating device 204 configured to provide braking torque to the driveline. A control unit 100 is configured to acquire data 202 indicating a potential regenerative charging amount for the electric energy storage 2 during an upcoming braking cycle 9 for the electric vehicle 1.

Determining a potential regenerative charging amount may be achieved in different ways. For example, as is indicated in the flow-chart in FIG. 4, the step S102 may be preceded by step S202 comprising acquiring planned route data indicative of a drive cycle of the electric vehicle including the braking cycle 9. Step S102 may then include determining the potential regenerative charging amount using the planned route data. The planned route data may be comprised in the data 202 acquired by the control unit 100 which determines the potential regenerative charging amount from the planned route data 202.

The planned route data indicates the GPS coordinates of the upcoming drive cycle as determined from for example a predictive route feature able to predict an upcoming drive cycle based on for example the specific driver, time of day, day of the week, month, location. The planned route data may further be based on a requested route made to a navigation system of the vehicle. As a further example, the planned route data may be a predetermined commercial route or bus route known even prior to departure and that is loaded into the navigation system of the vehicle 1. Generally, the planned route comprises a set of GPS coordinates indicating the route.

Further, the vehicle 1, and other vehicles, may be equipped with a predictive system configured to collect and store route data while travelling. The route data may include road and vehicle characteristics such as road inclination, the type of road material such as gravel asphalt, concrete, etc, road altitude, uphill sections and downhill sections, braking cycles, and even potential regenerative charging amounts and the associated coordinates. The route data may be memorized while travelling in a local memory and is uploaded to a cloud-based system accessible to a fleet of vehicles each connected to the cloud based system. The route data may also be directly uploaded to the cloud-based system, i.e., to a remote server.

In some possible implementations, the potential regenerative charging amount is determined from historical potential regenerative charging amounts at the upcoming braking cycle 9. The control unit 100 may hereby evaluate data 202 indicating previous instances where regenerative charging events has occurred at the upcoming braking cycle 9, and based on the previous regenerative charging events, determine by means or calculations or estimations, the potential regenerative charging amount when reaching the braking cycle next time, i.e., during a present drive cycle. For example, the control unit 100 may use information concerning recent potential regenerative charging amounts at the upcoming brake cycle as input and adjust the input according to the present weight of the vehicle to determine the potential regenerative charging amount for the upcoming braking cycle 9.

Further, the potential regenerative charging amount can be determined from a topography of the planned route from which an upcoming braking cycle 9 can be predicted. The topography indicates the loss h in altitude. With prior knowledge of the vehicle's weight the potential energy lost due to the loss h in altitude can be calculated by the control unit 100. With further information of vehicle speed relating to kinetic energy, the total potential regenerative charging amount may be estimated by the control unit 100. Additional data related to air resistance and rolling resistance may be included in calculating the potential regenerative charging amount depending on the specific algorithm used.

Figure 4:
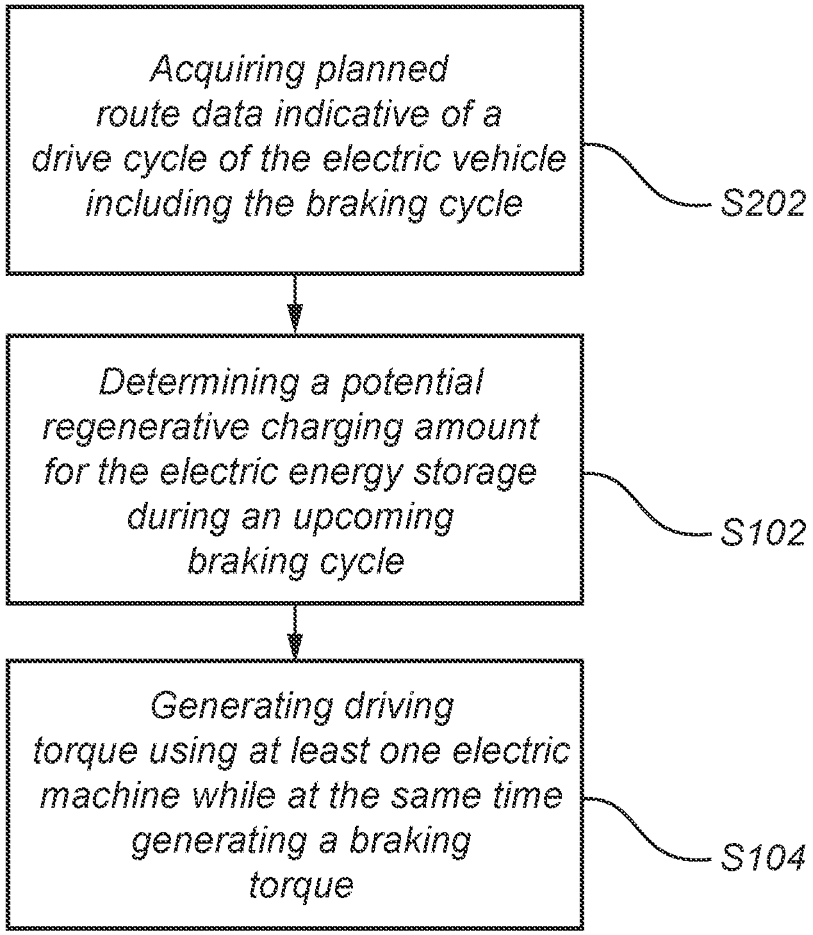
FIG. 4 is a flow-chart of method steps according to example embodiments of the invention.

Returning to the flow-charts in FIGS. 3 and 4, the method includes, before reaching the braking cycle 9, generating driving torque using at least one electric machine 102*a* while at the same time generating a braking torque using a brake generating device 102*b*, 204 to discharge the electric energy storage sufficient to receive the potential regenerative charging amount at the upcoming braking cycle 9 in step S104.

For step S104, the control unit 100 is configured to control the at least one electric machine 102 to generate driving torque and the brake generating device 204 to simultaneously as the driving torque is generated, generate braking torque, to discharge the electric energy storage sufficient to receive and store the potential regenerative charging amount at the upcoming braking cycle.

The generated driving torque corresponds to the sum of a demanded driving torque and the generated braking torque. This provides for the discharging of the electric energy storage 2 without affecting, or with minimal effect on the driving capability of vehicle as experienced by the driver.

The control unit 100 may evaluate the time or distance needed for discharging the electric energy storage sufficient before reaching the brake cycle 9. For example, the control unit 100 may acquire data indicating a present state of charge of the battery 2 and calculate at what pace the battery 2 must be discharged to reach a preparatory state of charge to receive the regenerative charging at the brake cycle 9. Using the present state of charge, the determined potential regenerative charging amount, and an estimate of the discharge rate, the control unit 100 may initiate the generation of driving torque at a time and with a magnitude so that the discharging of the electric energy storage 2 is completed immediately before reaching the braking cycle 9. For example, the control unit 100 may calculate that, with the present speed and topography of the road section 7 before the brake cycle 9, the generation of driving torque must be initiated at a distance dbefore reaching the brake cycle 9.

The electric vehicle may comprise a secondary braking system for generating the braking torque. For example, the secondary braking system may comprise a retarder adapted to generated braking torque as demanded by the control unit 100. The retarder may be configured to provide at least part of the braking torque and may be assisted by for example an electric machine.

Figure 6:
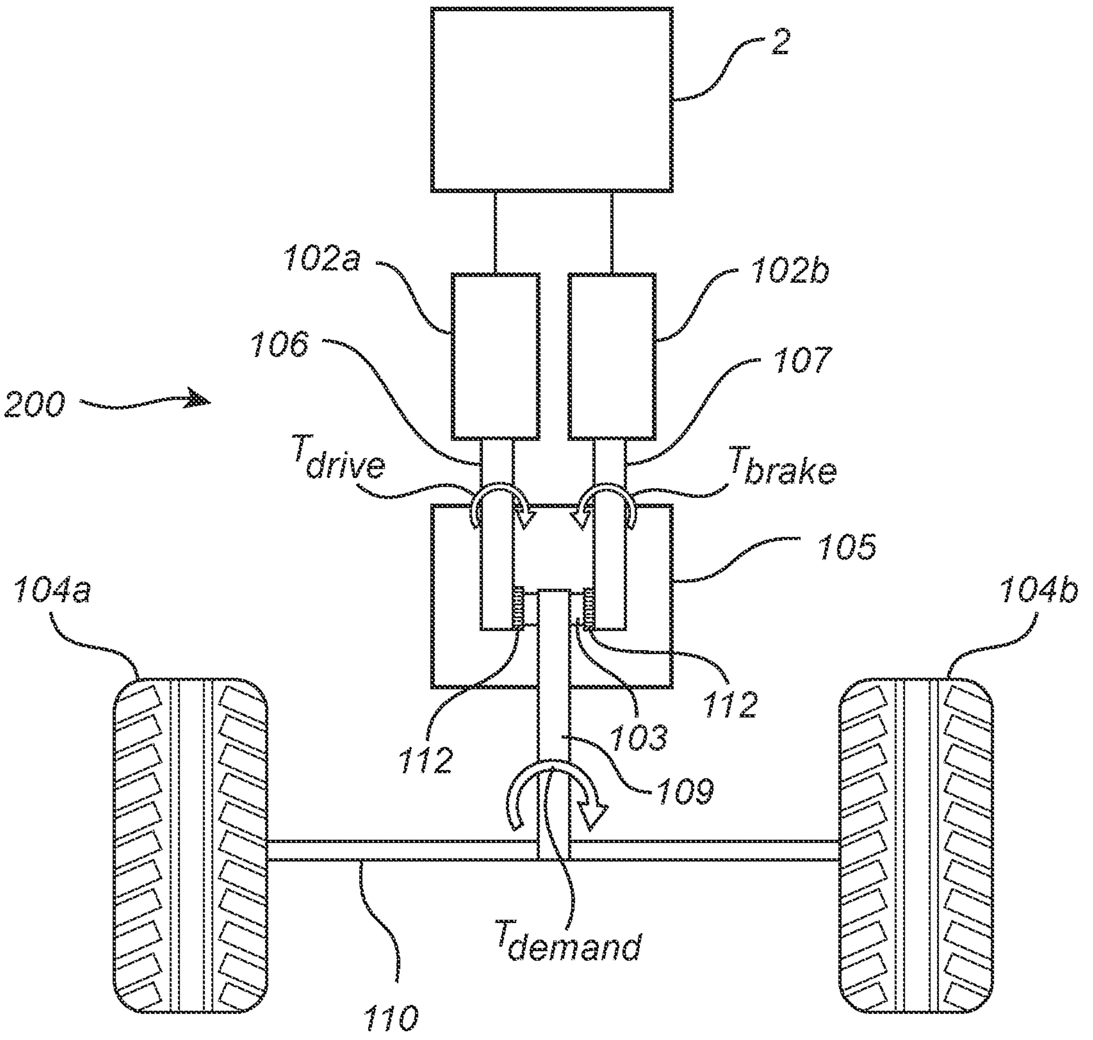
FIG. 6 conceptually illustrates a driveline system according to example embodiments of the invention.

Turning to FIG. 6, conceptually illustrating a driveline system 200 according to embodiments of the invention. The drive line system 200 comprises two electric machines 102*a* and 102*b* electrically connected to a propulsion battery 2 via converters, PWM (pulse-width modulation) modules, and other electric components needed for converting the energy in the battery 2 to a suitable voltage or current level for the electric machines 102*a-b*.

Components for conversion of energy in the battery 2 to a suitable voltage or current level for the electric machines 102*a-b* are considered known in the art and are not denoted in the drawing or discussed in further detail herein.

Further, the electric machines 102*a-b* are mechanically connected to the wheels 104*a-b* via respective shafts 106 and 107 connected to a common input shaft 103 of a gear box 103 by means or a respective gear train 112 or any other suitable gear connection. The output shaft 109 from the gear box 105 provides power to the driving axle 110 of the wheels 104*a-b*.

In one embodiment, one of the electric machines, for example electric machine 102*a* is used for providing a driving torque $T_{drive}$ and the other electric machine 102*b* is used for providing braking torque $T_{brake}$. In other words, the brake generating device is at least one of the electric machines that is not generating driving torque. The driving torque Tame and the braking torque $T_{brake}$ are of opposite direction so that they partly cancel at the input shaft 103 of the gear box 105. However, the generated driving torque $T_{drive}$ corresponds to the sum of a demanded driving torque, $T_{demand}$, and the generated braking torque. In other words, $T_{drive}=T_{demand}\ T_{brake}$. The output torque of the gear box is thus substantially equal to the torque presently demanded by the driver, $T_{demand}$.

In some embodiments, the electric vehicle comprises a secondary braking system which may contribute to the braking torque $T_{brake}$. However, in preferred embodiments the brake generating device is a further electric machine 102*b* configured to provide the braking torque.

There is further provided a computer program comprising program code means for performing the steps of the method according to any one of the herein discussed methods such as described with reference to the flow-charts in FIGS. 3 and 4 when the program is run on a computer such as including the control unit 100.

There is further provided a computer readable medium carrying a computer program comprising program code means for performing perform the steps of the method according to any one of the herein discussed methods such as described with reference to the flow-charts in FIGS. 3 and 4 when the program product is run on the computer.

The control unit 100 is configured to perform the steps of the method according to any one of the herein discussed methods such as described with reference to the flow-charts in FIGS. 3 and 4

The control unit 100 is either hardwired or wirelessly connected to the electric machines and the brake generating device, and to a storage or source of the data 202. For example, the data 200 may be acquired from a local memory of the vehicle or from a server i.e., the Cloud. A wireless communication system of the vehicle is configured to provide wireless communication with the cloud. Wireless communication systems include known protocols of telecommunications and Wi-Fi means.

A control unit may include a microprocessor, microcontroller, programmable digital signal processor or another programmable device. Thus, the control unit comprises electronic circuits and connections (not shown) as well as processing circuitry (not shown) such that the control unit can communicate with different parts of the truck such as the brakes, suspension, driveline, in particular an electric engine, an electric machine, a clutch, and a gearbox in order to at least partly operate the truck. The control unit may comprise modules in either hardware or software, or partially in hardware or software and communicate using known transmission buses such as CAN-bus and/or wireless communication capabilities. The processing circuitry may be a general purpose processor or a specific processor. The control unit comprises a non-transitory memory for storing computer program code and data upon. Thus, the skilled addressee realizes that the control unit may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A method for energy management of an electric energy storage of an electric vehicle comprising at least one electric machine, the method comprising:

determining a potential regenerative charging amount for the electric energy storage during an upcoming braking cycle for the electric vehicle;

before reaching the braking cycle, controlling at least one electric machine to generate driving torque while at the same time generating a brake torque that at least partly counteracts the generated driving torque using at least one of the remaining electric machines that is not generating the driving torque to discharge the electric energy storage sufficient to receive the potential regenerative charging amount at the upcoming braking cycle, wherein the at least one electric machine that is generating the driving torque and the at least one electric machine that is generating the braking torque are connected to a common input shaft of a gear box from which an output shaft provides power to a driving axle of at least two wheels of the electric vehicle, wherein the generated driving torque corresponds to the sum of a demanded driving torque and the generated braking torque.

2. The method according to claim 1, wherein the electric vehicle comprises a secondary braking system, wherein generating the braking torque comprises generating at least part of the braking torque using the secondary braking system.

3. The method according to claim 1, comprising:

acquiring planned route data indicative of a drive cycle of the electric vehicle including the braking cycle, wherein the step of determining a potential regenerative charging amount comprises determining the potential regenerative charging amount using the planned route data.

4. The method according to claim 3, wherein generating the driving torque before reaching the braking cycle comprises:

initiating the generation of driving torque at a time and with a magnitude so that the discharging of the electric energy storage is completed immediately before reaching the braking cycle.

5. The method according to claim 3, wherein the potential regenerative charging amount is determined from historical potential regenerative charging amounts at the upcoming braking cycle.

6. The method according to claim 3, wherein the potential regenerative charging amount is determined from a topography of the planned route from which an upcoming braking cycle can be predicted.

7. A non-transitory computer readable medium carrying a computer program comprising program code for performing the steps of claim 1 when the program code is run on a computer.

8. A control unit for energy management of an electric energy storage of an electric vehicle comprising at least one electric machine, the control unit being configured to perform the steps of the method according to claim 1.

9. An electric driveline system for an electric vehicle comprising an electric energy storage system, comprising:

at least one electric machine configured to provide driving torque and at least one electric machine configured to provide braking torque to a driveline of the electric machine via a common input shaft of a gear box from which an output shaft provides power to a driving axle of at least two wheels of the electric vehicle, and a control unit configured to:

acquire data indicating a potential regenerative charging amount for the electric energy storage during an upcoming braking cycle for the electric vehicle;

before reaching the braking cycle, control at least one electric machine to generate driving torque and control another electric machine to to simultaneously as the driving torque is generated, generate braking torque that at least partly counteracts the generated driving torque, to discharge the electric energy storage sufficient to receive the potential regenerative charging amount at the upcoming braking cycle, wherein the generated driving torque corresponds to the sum of a demanded driving torque and the generated braking torque.

10. The energy management system according to claim 9, wherein the brake generating device comprises a retarder configured to provide at least part of the braking torque.

11. The energy management system according to claim 9, the control unit being configured to acquire planned route data indicative of a drive cycle of the electric vehicle including the braking cycle, and to determine the potential regenerative charging amount from the planned route data.

12. A vehicle comprising a system according to claim 9.

* * * * *